(No Model.)
M. WADDELL & J. B. ENTZ.
SECONDARY BATTERY.
No. 461,858. Patented Oct. 27, 1891.
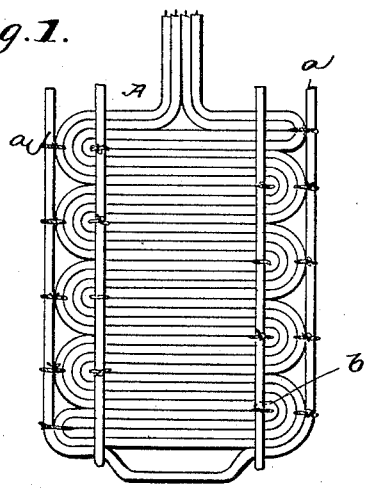
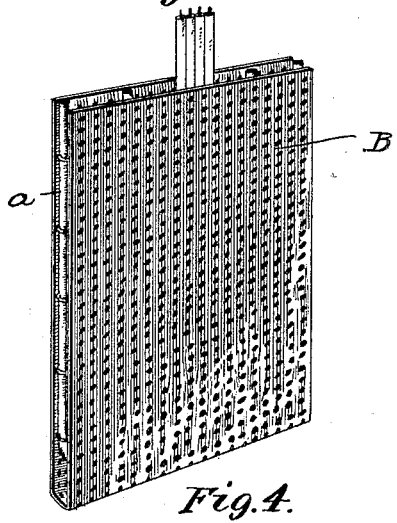
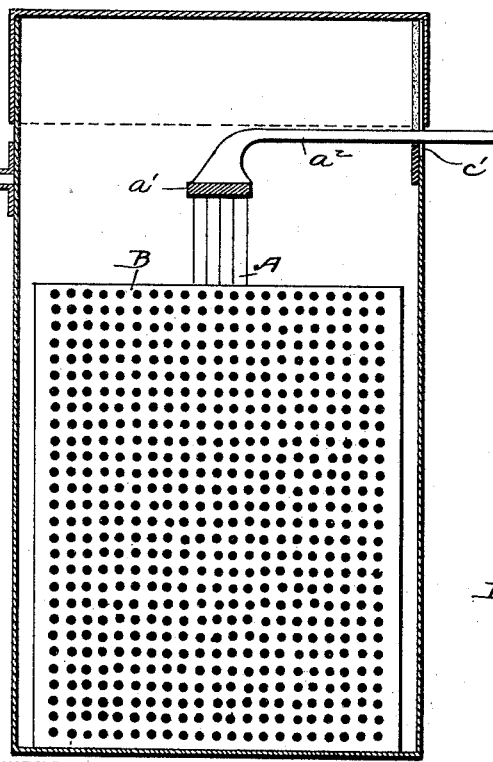
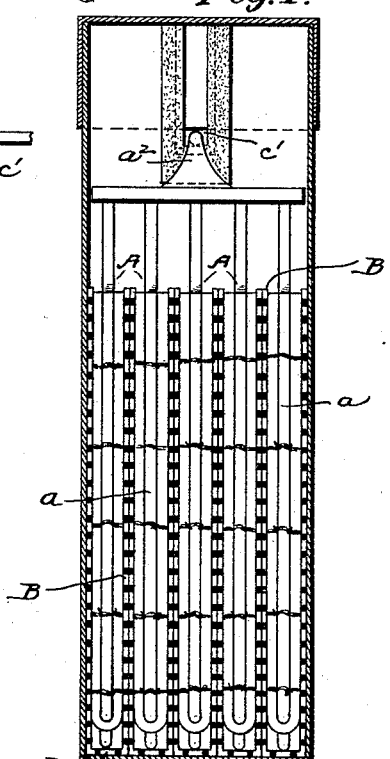
WITNESSES:
INVENTORS.
Montgomery Waddell and
Justus B. Entz.
BY
ATTORNEY.

UNITED STATES PATENT OFFICE.

MONTGOMERY WADDELL AND JUSTUS B. ENTZ, OF NEW YORK, N. Y., ASSIGNORS TO THE WADDELL-ENTZ ELECTRIC COMPANY, OF SAME PLACE.

SECONDARY BATTERY.

SPECIFICATION forming part of Letters Patent No. 461,858, dated October 27, 1891.

Application filed October 31, 1890. Serial No. 369,931. (No model.)

*To all whom it may concern:*

Be it known that we, MONTGOMERY WADDELL, a subject of the Queen of Great Britain, and JUSTUS B. ENTZ, a citizen of the United States, both residing in New York, county of New York, and State of New York, have invented certain new and useful Improvements in Secondary Batteries, of which the following is a specification.

Our invention relates to improvements in electric batteries, and has particular reference to secondary or storage batteries of the kind described in Letters Patent No. 421,916, granted to Entz and Phillips February 26, 1890.

The object of this invention is to provide a battery which shall be simple and compact in construction; and it consists of the details hereinafter described and claimed.

In the accompanying drawings, Figure 1 represents a side view of one of the positive plates of our improved battery. Fig. 2 represents in perspective a positive and negative plate arranged with respect to each other as they are placed in the cell. Fig. 3 represents a vertical section of a cell, and Fig. 4 a similar section taken at right angles to the view shown in Fig. 3.

This battery belongs to the class known as the "copper alkaline zincite battery," in which the positive plate consists of reduced copper and the negative plate of iron coated with tin. These are in a solution of potassium or sodium zincite. When a current is passed through such a battery, the positive electrode oxidizes and zinc deposits upon the negative, thus enabling the battery to regain its charge. This invention comprehends a positive plate made up of reduced copper wire covered with porous insulating material, such as cotton braid, and made into the form of a mat, as shown in Fig. 1. Its parts or layers are held together by means of binding-wires $a$ and $b$, which are themselves insulated with a textile material and the insulation impregnated with whiting and silicate of soda. The binding-wires $a$ and $b$ are tied to the plates at different points for the purpose of securing all together. When such plates are put into a solution of potash, the whiting and silicate of soda are transformed into a vitreous or stone-like matter, which renders the wires $a$ and $b$ very strong and durable, besides enhancing their insulating properties. The negative plate B consists of a sheet of tin having a large number of perforations, as shown. This sheet is bent over upon itself along its middle portion to form an envelope, within which is placed a positive plate A. This constitutes a complete couple, and it will be observed that the metallic portion of the positive plate is thoroughly insulated from the negative plate, no matter how hard a pressure is brought to bear upon the sides of the tin plate. In fact, it will be seen later on that the envelopes are normally held in close contact with the sides of insulated positive plates. Their special arrangement with relation to each other is illustrated in Fig. 4, wherein it will be seen that each envelope contains a positive plate and that the negative plates are successively in contact with one another. The cells in which the plates are contained are metallic, preferably of tin, and the negative plates or envelopes rest directly upon the bottom of the cell and the end ones against its sides. The cell itself may therefore be used as a portion of the circuit, and the connecting-conductor $c$ may be attached directly to it, as shown in Fig. 3. The positive plates are connected to a metallic cross-bar $a'$, which is soldered or otherwise secured to a conductor $a^2$, leading out through an opening in the side of the cell, as shown in Fig. 3. This opening $c'$ is a slot cut from the upper edge of the cell down to a point below where the flange of the cover of the cell comes and is provided with a lining, or rather a bushing, of rubber, upon which the conductor $a^2$ has its bearing in order to insulate it from the metallic cell. With this arrangement of the plates it is obvious that a large number of them may be deposited in a comparatively small cell, as they may be pressed into close contact with each other. It is further remarked that inasmuch as the binding-wires $a$ are quite thick, so that they stand at some distance from the surface of the mat or plate, all the wear due to the movement of the plates with respect to each other will be upon these wires and not upon the face of the electrode, so that the porous insulation of the electrode itself is not subjected to wear.

Having thus described our invention, we claim—

1. In a secondary battery, the combination of a positive and a negative electrode, one contained within the other and one being entirely covered or protected with insulating material, for the purpose set forth.

2. In a secondary battery, an insulated positive electrode contained within an uninsulated perforated envelope of tin, constituting the negative electrode, substantially as described.

3. In a secondary battery, a containing-cell forming part of the circuit and having connected with it the conductor $c$, and also provided with a slot or opening for the second electric conductor, the slot being fitted with insulating material, substantially as set forth.

4. In a secondary battery, a plurality of insulated positive electrodes inclosed, respectively, by a plurality of negative electrodes, the two sets or groups being in mechanical contact with one another, substantially as described.

In witness whereof we have hereunto signed our names in the presence of two subscribing witnesses.

MONTGOMERY WADDELL.
JUSTUS B. ENTZ.

Witnesses:
FRANK S. OBER,
WM. A. ROSENBAUM.